(12) United States Patent
Silva Vieira et al.

(10) Patent No.: US 11,293,591 B2
(45) Date of Patent: Apr. 5, 2022

(54) HYBRID PRESSURE VESSEL WITH PLASTIC LINER

(71) Applicant: AMTROL LICENSING, INC., West Warwick, RI (US)

(72) Inventors: Pedro Alexandre Queiros Oliveira Silva Vieira, Matosinhos (PT); Carlos Alberto Oliveira, Guimarães (PT); Tiago Teixeira Rego De Oliveira, Oporto (PT)

(73) Assignee: AMTROL LICENSING, INC., West Warwick, RI (US)

( * ) Notice: Subject to any disclaimer, the term of this patent is extended or adjusted under 35 U.S.C. 154(b) by 121 days.

(21) Appl. No.: 16/661,710

(22) Filed: Oct. 23, 2019

(65) Prior Publication Data

US 2020/0132252 A1    Apr. 30, 2020

Related U.S. Application Data

(60) Provisional application No. 62/749,909, filed on Oct. 24, 2018.

(51) Int. Cl.
*F17C 1/02* (2006.01)
*F17C 13/04* (2006.01)

(52) U.S. Cl.
CPC .............. *F17C 1/02* (2013.01); *F17C 13/04* (2013.01); *F17C 2201/0109* (2013.01);
(Continued)

(58) Field of Classification Search
CPC .... F17C 1/02; F17C 13/04; F17C 2201/0109; F17C 2203/011; F17C 2203/0604;
(Continued)

(56) References Cited

U.S. PATENT DOCUMENTS

| 1,517,978 A | 12/1924 | Giese |
| D210,878 S | 4/1968 | Schaefer |

(Continued)

FOREIGN PATENT DOCUMENTS

| CN | 200630120323 | 8/2007 |
| CN | 201930024472.4 | 7/2019 |

(Continued)

OTHER PUBLICATIONS

"17lb Capacity Lightweight Composite Propane Tank", Found on Jan. 26, 2021 at https://www.amazon.com/17lb-Capacity-Lightweight-Composite-Propane/dp/B014V9H6R0/, (Year: 2016), 7 pages.

(Continued)

*Primary Examiner* — Shawn M Braden
(74) *Attorney, Agent, or Firm* — Tucker Ellis LLP

(57) ABSTRACT

The innovation described herein generally pertains to a system and method related to a pressure vessel including a tank formed of an injected tank liner with co-injected boss and permeation barrier film surrounded by a layer of thermoplastic composite filament winding and a protective jacket disposed thereon that facilitates stacking and portability of the pressure vessel and provides an air passage for convective heat transfer between the tank and the environment.

15 Claims, 12 Drawing Sheets

(52) U.S. Cl.
CPC . *F17C 2203/011* (2013.01); *F17C 2203/0604* (2013.01); *F17C 2203/066* (2013.01); *F17C 2203/0629* (2013.01); *F17C 2205/0165* (2013.01); *F17C 2205/0305* (2013.01); *F17C 2205/0323* (2013.01); *F17C 2209/2118* (2013.01); *F17C 2209/232* (2013.01)

(58) Field of Classification Search
CPC ........ F17C 2203/0629; F17C 2203/066; F17C 2205/0165; F17C 2205/0305; F17C 2205/0323; F17C 2209/2118; F17C 2209/232; Y10S 220/913
See application file for complete search history.

(56) References Cited

U.S. PATENT DOCUMENTS

| | | | |
|---|---|---|---|
| 3,508,677 | A | 4/1970 | Laibson |
| 3,788,511 | A | 1/1974 | Marsh |
| 3,843,010 | A | 10/1974 | Morse |
| D243,530 | S | 3/1977 | Bodine |
| 4,225,051 | A | 9/1980 | Faudou |
| 4,360,116 | A | 11/1982 | Humphrey |
| 4,653,663 | A | 3/1987 | Holtsclaw |
| D306,639 | S | 3/1990 | Wills |
| 4,905,856 | A | 3/1990 | Krogager |
| 4,925,044 | A | 5/1990 | Hembert |
| 5,025,943 | A | 6/1991 | Forsman |
| 5,072,851 | A | 12/1991 | Wilkes |
| 5,253,778 | A | 10/1993 | Sirosh |
| 5,287,987 | A | 2/1994 | Gaiser |
| 5,287,988 | A | 2/1994 | Murray |
| 5,385,262 | A | 1/1995 | Coquet et al. |
| 5,476,189 | A | 12/1995 | Duvall |
| 5,492,364 | A | 2/1996 | Anderson |
| 5,494,188 | A | 2/1996 | Sirosh |
| 5,518,141 | A | 5/1996 | Newhouse |
| 5,568,878 | A | 10/1996 | Lebreton |
| 5,653,358 | A | 8/1997 | Sneddon |
| 5,673,794 | A | 10/1997 | Kuipers |
| 5,758,796 | A | 6/1998 | Nishimura |
| 5,890,750 | A | 4/1999 | Channell |
| 6,012,411 | A | 1/2000 | Hochbrueckner |
| 6,015,065 | A | 1/2000 | McAlister |
| 6,022,435 | A | 2/2000 | Palazzo |
| 6,135,308 | A | 10/2000 | Fang |
| 6,189,723 | B1 | 2/2001 | Davis |
| 6,386,384 | B1 | 5/2002 | Chohfi |
| 6,401,963 | B1 | 6/2002 | Seal |
| 6,460,721 | B2 | 10/2002 | Bowen |
| 6,651,307 | B2 | 11/2003 | Portmann |
| D497,283 | S | 10/2004 | Groombridge |
| 7,255,245 | B2 | 8/2007 | Oliveira |
| D558,950 | S | 1/2008 | Brans |
| D566,807 | S | 4/2008 | Oliveira et al. |
| 7,549,555 | B2 | 6/2009 | Suzuki et al. |
| 7,699,188 | B2 | 4/2010 | Oliveira et al. |
| 7,743,940 | B2 | 6/2010 | Brunnhofer |
| 7,943,884 | B2 | 5/2011 | Ishikawa |
| 7,946,446 | B2 | 5/2011 | Kimbara et al. |
| 8,313,595 | B2 | 11/2012 | Blanc et al. |
| D746,942 | S | 1/2016 | Koppert et al. |
| 9,285,078 | B2 | 3/2016 | Liebengerg et al. |
| 10,088,102 | B2 * | 10/2018 | Aguiar ...................... F17C 1/02 |
| 2003/0111473 | A1 | 6/2003 | Carter |
| 2005/0001394 | A1 | 1/2005 | Gibby |
| 2005/0269338 | A1 | 12/2005 | Oliveira et al. |
| 2007/0068957 | A1 | 3/2007 | Oliveira et al. |
| 2010/0147859 | A1* | 6/2010 | Chohfi ................. F17C 13/123 220/581 |
| 2011/0147390 | A1* | 6/2011 | Silva Vieira .......... F17C 13/084 220/590 |
| 2011/0168726 | A1 | 7/2011 | Silva Vieira et al. |
| 2014/0014668 | A1 | 1/2014 | Silva Vieira et al. |
| 2014/0332544 | A1 | 11/2014 | Nolan et al. |
| 2016/0215928 | A1* | 7/2016 | Chohfi ...................... F17C 1/00 |

FOREIGN PATENT DOCUMENTS

| | | |
|---|---|---|
| CN | 202030048846.9 | 7/2020 |
| EM | 002887410001 | 8/2005 |
| EP | 0146081 | 6/1985 |
| EP | 0666450 | 8/1995 |
| EP | 0958473 A1 | 11/1999 |
| FR | 2707369 A1 | 1/1995 |
| FR | 2716951 | 9/1995 |
| JP | 09042594 | 2/1997 |
| JP | 2000046296 | 2/2000 |
| JP | 2000213691 | 8/2000 |
| JP | 2008164132 | 7/2008 |
| JP | 2010116980 | 5/2010 |
| KR | 3020190008786 | 8/2019 |
| WO | 9717570 | 5/1997 |
| WO | 9834063 | 8/1998 |
| WO | 0066939 | 11/2000 |
| WO | 0157429 | 8/2001 |
| WO | 03029718 | 4/2003 |

OTHER PUBLICATIONS

Viking Cylinders, Found on Jan. 26, 2021 at https://www.vikingcylinders.com/shop/ (Year: 2019), 2 pages.

"Trident Hose Tank-composite Lp Gas 22lb 1420-0022", Found on Jan. 26, 2021 at https://www.amazon.com/Trident-Hose-Tank-composite-Gas-1420-0022/dp/B017QRH N HC/, (Year: 2017), 7 pages.

International Search Report and Written Opinion corresponding to PCT Application No. PCT/US2019/057655, dated Feb. 6, 2020, 15 pages.

Health & Safety Executive Specification for Welded Steel Non Refillable Transportable Pressure Receptacles Dot 39 (HSE) Issue Jan. 1, 2000.

International Search Report dated Aug. 3, 2006 for PCT/US05/14151.

Intl. Search Report and The Written Opinion of the Intl. Searching Authority for PCT/US07/21056 dated Mar. 3, 2008.

Intl. Pre. Report on Patentability for PCT/US07/21056 dated Apr. 9, 2009.

Suppl. EP Search Report for EP 05738783 dated May 16, 2011.

Intl. Preliminary Report on Patentability issued in PCT/US2012/026509 dated Aug. 27, 2013.

Written Opinion issued in PCT/US2012/026509 dated Dec. 3, 2012.

* cited by examiner

HYBRID PRESSURE VESSEL WITH PLASTIC LINER

CROSS-REFERENCE TO RELATED APPLICATIONS

This application relates to U.S. Provisional Patent Application Ser. No. 62/749,909 filed on Oct. 24, 2018 entitled "HYBRID PRESSURE VESSEL WITH PLASTIC LINER", which is incorporated herein by reference in its entirety.

TECHNICAL FIELD

In general, the subject innovation relates to pressure vessels, and more particularly to a pressure vessel having a type IV tank formed of a tank liner and outer composite layer with a protective jacket disposed thereon.

BACKGROUND

Pressure vessels come in all sizes and shapes, and are made from a variety of materials. The need for lightweight pressure vessels has existed and still exists. There have been many failed and unsuccessful attempts to make light weight pressure vessels that are able to store fluids under high pressures for long periods of time, maintain structural integrity, sustain repeated pressurization and depressurization, and be substantially impermeable, resistant to corrosion, and easy to manufacture.

Increased use of alternative fuels, such as compressed natural gas and hydrogen to fuel vehicles, and the need for ever greater fuel range has increased the need for lightweight, safe tanks with greater capacity and strength. Increasing the capacity and strength of a pressure vessel can be achieved by increasing the amount of materials used for structural support. However, this can result in a significant increase in the size and/or weight of the pressure vessel, which can increase the cost of the tank arising from increased material costs and costs associated with transporting the heavier pressure vessels.

The environment concern is also a major importance. Sustainable solutions for products are important so as to ensure there is low impact from manufacturing, using and disposing products.

There is a need for a lightweight pressure vessel that is impermeable, corrosion resistant, recyclable and that can handle increased capacity and pressure demands while also being a competitive manufacturing price.

SUMMARY

The subject invention provides a pressure vessel that includes a plastic liner and other components that are recyclable. In particular, the subject invention provides a pressure vessel that includes a thermoplastic liner and an outer reinforcing layer disposed on the tank liner, with the outer reinforcing layer defining at least a portion of an outer surface of the tank. A protective jacket configured and dimensioned to engage the tank is disposed thereon. The protective jacket includes an upper support rim having a first opening therethrough, a lower support rim having a second opening therethrough, and a substantially cylindrical wall (also referred to as a "wall") connecting the upper support rim and lower support rim. The cylindrical wall defines an inner surface disposed radially outwardly from the outer surface of the tank, and the inner surface of the wall and the outer surface of the tank cooperate to define a flow channel in fluid communication with the first opening and the second opening, wherein the openings and flow channel are adapted to permit a convective flow to pass therethrough to facilitate heat transfer between the tank and an environment in which the pressure vessel is situated. The protective jacket is preferably separable into at least two sections. It is to be appreciated that the protective jacket can be configured to be one or more sections without departing from the scope of the subject innovation.

In accordance with a further embodiment of the subject innovation, the tank liner includes a material having a lower modulus of elasticity and a lower elastic strain limit than the outer reinforcing layer. If desired, the outer reinforcing layer can be fabricated of a thermoplastic material, preferably polypropylene with glass fibers with a technique in which polypropylene with glass fibers is presented with tapes that are pre-fabricated or pre-processed or in a commingled roving technique.

In accordance with another embodiment of the subject innovation, the upper support rim includes at least one handle and the lower support rim includes a base configured and adapted to form a non-permanent mating engagement with the at least one handle of another pressure vessel when stacking multiple pressure vessels.

The subject innovation also provides a method of manufacturing a pressure vessel with a plastic liner that is made via thermoplastic injection molding techniques. The method includes injection molding a tank liner and forming an additional layer around the tank liner. In an embodiment, the tank liner can be wound with glass tapes with a thermoplastic material. In another embodiment, the tank liner can be wound by commingling filaments with a thermoplastic material onto the tank liner under application of heat to form a tank having an outer surface (e.g., also referred to as the additional layer). It is to be appreciated that the tank liner is referred to as a "tank" after completion of the additional layer on the tank liner, wherein the additional layer can be a wrapping, commingling, or application of filaments, tapes, wraps, fiber materials, composite materials, and the like. Further, it is to be appreciated that the wrapping can include one or more materials such that the material can be a resin, a type of material for the fiber or wrap, a composition of materials, among others.

In further accordance with the subject innovation, the method further can include a step of at least one of manufacturing a protective jacket for the tank or assembling a protective jacket onto the tank. For example, the protective jacket can include an upper support rim having a first opening therethrough, a lower support rim having a second opening therethrough, and a substantially cylindrical wall connecting the upper support rim to the lower support rim that are configured to mate and surround the tank while maintaining the flow channel for air between the protective jacket and a surface of the tank. The cylindrical wall defines an inner surface disposed radially outwardly from the outer surface of the tank, and the inner surface of the wall and the outer surface of the tank cooperate to define a flow channel in fluid communication with the first opening and the second opening, wherein the openings and flow channel are adapted to permit a convective flow to pass therethrough to facilitate heat transfer between the tank and an environment in which the pressure vessel is situated.

In one embodiment, a pressure vessel includes a tank, including a tank liner fabricated from thermoplastic material; a valve fitting assembly; and an outer reinforcing layer disposed on the tank liner, the outer reinforcing layer defining at least a portion of an outer surface of the tank. The pressure vessel further includes a protective jacket adapted to surround and engage the tank, the protective jacket including an upper support rim defining a top aperture, wherein the valve fitting assembly extends through the top aperture, and a space between the upper support rim and the valve fitting assembly defines a first airflow opening; a lower support rim having a second airflow opening therethrough; and a substantially cylindrical wall connecting the upper support rim to the lower support rim, the wall defining an inner surface disposed radially outwardly from the outer surface of the tank, the inner surface of the wall and the outer surface of the tank cooperating to define a flow channel in fluid communication with the first airflow opening and the second airflow opening, wherein the first and second airflow openings and flow channel are adapted to permit a convective flow to pass therethrough to facilitate heat transfer between the tank and an environment in which the pressure vessel is situated.

In one embodiment, the tank liner includes a first endcap and a second endcap, wherein the first and second endcaps are injected Polymeric domes circumferentially welded. The tank liner can have a barrier film to increase impermeability.

In one embodiment, the tank liner further comprises a boss co-injected on one of the first endcap or the second endcap.

In one embodiment, the barrier film includes multiple layers.

In one embodiment, the barrier film includes at least one layer comprising polyethylene, at least one layer comprising polyamide, and a layer comprising ethylene vinyl alcohol (EVOH).

In one embodiment, the layer comprising EVOH has a thickness greater than or equal to 8 micrometers.

In one embodiment, the protective jacket is separable into at least two sections.

In one embodiment, the protective jacket includes at least one handle and wherein the lower support rim includes a base configured and is adapted to form a non-permanent mating engagement with the at least one handle of another pressure vessel when stacking multiple pressure vessels.

In one embodiment, the outer reinforcing layer includes a thermoplastic matrix with glass fiber reinforcement.

In one embodiment, the thermoplastic material includes polypropylene.

In one embodiment, the tank liner includes a substantially cylindrical tube defining first and second rims and opposing dome shaped first and second endcaps secured to the first and second rims of the tube.

In one embodiment, the tank liner includes opposing dome shaped first and second endcaps secured directly to each other.

In one embodiment, the tank liner includes a co-injected boss for receiving the valve fitting assembly therein.

In one embodiment, the flow channel is substantially annular.

In one embodiment, the first airflow opening encircles the valve fitting assembly. In one embodiment, a method of manufacturing a pressure vessel includes fabricating a tank liner with at least one boss co-injected, wherein the tank liner includes a first endcap and a second endcap, and the boss is on one of the first endcap or the second endcap; utilizing an in-mould barrier film in the injection process while fabricating the tank liner; creating a reinforcing layer on the tank liner with a composite material made of at least one of thermoplastic or glass onto the tank liner under application of at least one of heat or pressure to form a tank having an outer surface; encasing the tank liner having the reinforcing layer with a protective jacket having an upper support rim removably coupled to a lower support rim; and storing a gas material in a volume of the tank liner protected by the reinforcing layer and protective jacket.

In one embodiment of the method, the protective jacket includes an upper support rim defining a top aperture, wherein the valve fitting assembly extends through the top aperture, and a space between the upper support rim and the valve fitting assembly defines a first airflow opening; a lower support rim having a second airflow opening therethrough; and a substantially cylindrical wall connecting the upper support rim to the lower support rim, the wall defining an inner surface disposed radially outwardly from the outer surface of the tank, and the inner surface of the wall and the outer surface of the tank cooperating to define a substantially annular flow channel in fluid communication with the first airflow opening and the second airflow opening. The first and second openings and flow channel are adapted to permit a convective flow to pass therethrough to facilitate heat transfer between the tank and an environment in which the pressure vessel is situated.

In one embodiment of the method, the barrier film includes at least one layer comprising polyethylene, at least one layer comprising polyamide, and a layer comprising ethylene vinyl alcohol (EVOH).

In one embodiment of the method, the layer comprising EVOH has a thickness greater than or equal to 8 micrometers.

In one embodiment, a pressure vessel includes a tank including a tank liner constructed from a thermoplastic material having a boss co-injected therewith, a valve fitting assembly coupled with the boss, a reinforcing layer disposed on the tank liner, a top region, a bottom region disposed opposite the top region, and a middle region disposed between the top region and the bottom region. The pressure vessel further includes a protective jacket surrounding the tank. The protective jacket includes an upper support rim that defines a top aperture, wherein the valve fitting assembly extends through the top aperture such that a space between the upper support rim and the valve fitting assembly defines a first airflow opening, and the protective jacket further includes a second airflow opening in fluid communication with the first airflow opening, wherein the protective jacket is spaced apart radially from the middle region. The protective jacket further includes a means for directing a downward convective airflow between the middle region of the tank and the protective jacket. The means for directing a flow are in fluid communication with an ambient environment external to the pressure vessel via the at least one upper vent and the at least one lower vent.

These and other objects of this innovation will be evident when viewed in light of the drawings, detailed description and appended claims.

BRIEF DESCRIPTION OF THE DRAWINGS

The innovation may take physical form in certain parts and arrangements of parts, a preferred embodiment of which will be described in detail in the specification and illustrated in the accompanying drawings which form a part hereof, and wherein.

DETAILED DESCRIPTION

Figure 1:
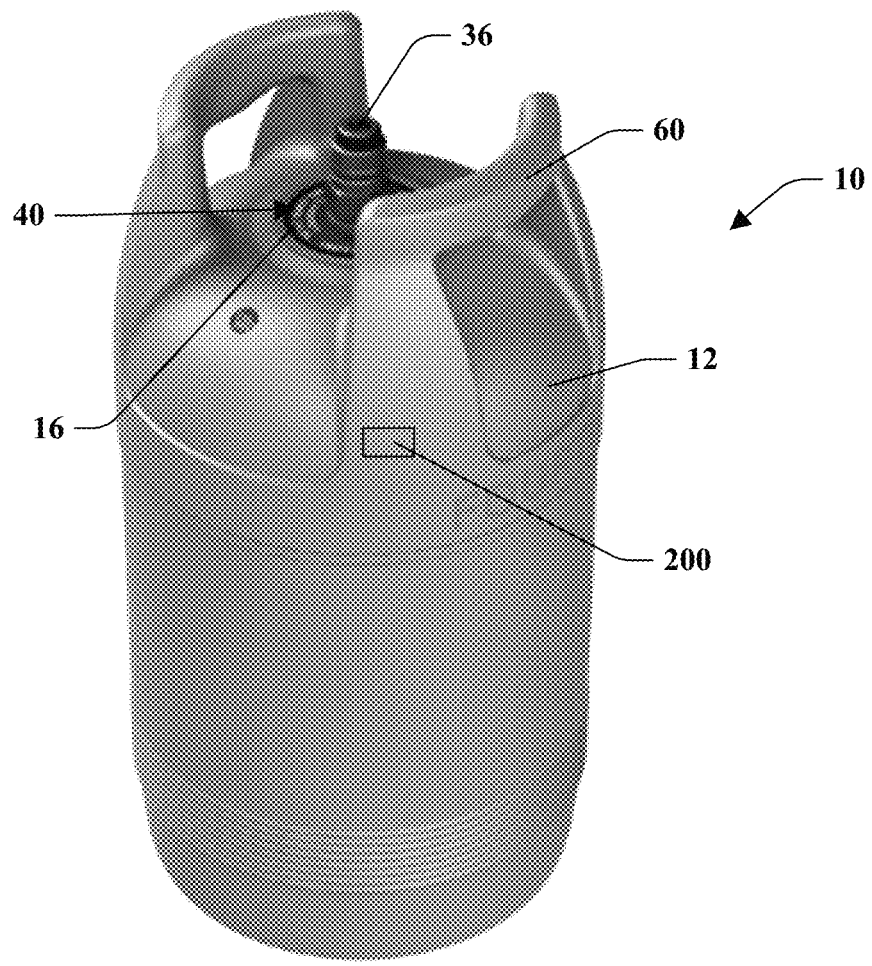
FIG. 1 is a perspective view of a pressure vessel constructed in accordance with a preferred embodiment of the subject invention as seen from above, showing the opening in the upper support rim of the protective jacket, as well as a valve fitting assembly, and handles on the upper support rim.

Embodiments of the innovation relate to methods and systems that relate to an injection molded, polymeric liner for use as a pressure vessel. The subject innovation includes an injected polymeric liner manufactured to hold a volume with one or more apertures to receive one or more valves to fill or dispense. For instance, the polymeric liner can be welded circumferentially, which includes a co-injected boss, an in-mold barrier structure and subsequently filament wound with a thermoplastic composite. The subject innovation includes the materials for the product to be recyclable whereas conventional products may includ a liner which is not a recyclable plastic.

The term "component" as used herein can be defined as a portion of hardware, a portion of software, or a combination thereof. A portion of hardware can include at least a processor and a portion of memory, wherein the memory includes an instruction to execute. The term "container" or "tank" as used herein can be defined as any cylinder, housing, canister, and the like of any suitable material that can house or contain at least one of a liquid, gas, solid, such as, but not limited to, a propane, a compressed natural gas, a gasoline, a hydrogen, a liquid nitrogen, an alternative fuel, a renewable fuel source, a nonrenewable fuel source, a liquid fuel source, or a gas fuel source. The term "recyclable" as used herein can be defined as being melted or re-heated to be repurposed and reused without destruction of the item or material being re-heated or melted. In particular, "recyclable" can refer to a plastic that during the curing process that is completely reversible as no chemical bonding takes place which allows the materials to be remolded and recycled without negatively affecting the material's physical properties. On the contrary, a non-recyclable material such as thermoset materials contain polymers that cross-link together during the curing process to form an irreversible chemical bond in which the cross-linking process eliminates the risk of the materials changing when heat is added.

While the embodiments discussed herein have been related to the systems and methods discussed above, these embodiments are intended to be exemplary and are not intended to limit the applicability of these embodiments to only those discussions set forth herein. The embodiments and discussions herein can be readily incorporated into any of these systems and methodologies by those of skill in the art.

With reference to the drawings, like reference numerals designate identical or corresponding parts throughout the several views. However, the inclusion of like elements in different views does not mean a given embodiment necessarily includes such elements or that all embodiments of the innovation include such elements. The examples and figures are illustrative only and not meant to limit the innovation, which is measured by the scope and spirit of the claims.

A pressure vessel, portions thereof, views thereof are illustrated in FIGS. 1-11.

The pressure vessels presented herein, and the products of the methods presented herein, may be used for storing pressurized fluids or materials. The subject innovation is particularly suited for storing and dispensing pressurized fluids while facilitating stacking and portability of the pressure vessel. A pressure vessel constructed in accordance with the subject innovation is suitable for applications including, but not limited to, storing materials, storing propane, refrigerant gas, and liquids or gases at low or high pressure.

In accordance with the subject innovation, a pressure vessel is provided including a tank having an inner plastic liner and an outer reinforcing layer, and a protective jacket adapted to surround the tank, wherein the tank, the inner plastic liner, the outer reinforcing layer and the protective jacket are thermoplastic materials that are recyclable rather than thermoset materials that are not recyclable. The protective jacket includes an upper support rim having an opening therethrough and a lower support rim having a second opening therethrough. The protective jacket also includes a substantially cylindrical wall spaced apart from the tank to create a flow channel which allows a convective flow of air between the protective jacket and the tank for convective heat transfer between the pressure vessel and the environment outside and surrounding the pressure vessel to reduce pressure loss during consumption of the pressurized contents within the tank.

For purpose of explanation and illustration, and not limitation, a view of an exemplary embodiment of a pressure vessel made in accordance with the subject innovation is depicted in FIG. 1 and is designated generally by reference number 10. Other aspects of the pressure vessel depicted in FIG. 1 are depicted in FIGS. 2-11 as will be described.

For purposes of illustration and not limitation, as embodied herein and as depicted in FIGS. 1-11, a pressure vessel 10 is provided with a tank 14. Tank 14 has a tank liner 38 that may be formed from a generally cylindrical tube 20 and first and second dome-shaped, semi-hemispherical endcaps 22 and 24, wherein the tank 14 is fabricated from a plastic. It is to be appreciated that the cylindrical tube 20 can be oval, circular, polygon, or a shape that connects to the endcaps 22 and 24. In particular, the tank 14 can be fabricated by an injection molding technique. Endcaps 22 and 24 may be of any size or shape, such as frustro-conical or flattened, and may be identical or different in shape, size, ratio, or dimensions. First and second endcaps 22 and 24 are secured to first and second end rims 26 and 28 of tube 20, respectively. It is to be appreciated that the tank liner 38 can be injected molded as one-piece, as a tube piece and two endcaps 22, 24, and coupled together, or a combination thereof. Tube 20 and first and second endcaps 22 and 24 cooperate to define vessel storage cavity 30, as particularly depicted in FIGS. 8 to 10.

As depicted, first endcap 22 includes a valve boss 34, which is secured to the tank liner 38 by co-injection. Valve boss 34 is configured to receive a valve fitting assembly 36 therein, and the combination permits the ingress or egress of fluids to and from the vessel storage cavity 30. Further, first endcap 22 can include a data plate 40. The data plate 40 includes an aperture that encircles the valve boss 34 and the valve fitting assembly 36. The data plate 40 provides a surface to include information pertaining to the pressure vessel 10 or its contents.

If desired, the tank liner 38 may be constructed without the cylindrical tube 20. In accordance with this alternative embodiment, endcaps 22 and 24 are joined directly to each other rather than to the cylindrical tube 20. As such, endcaps 22, 24 may take on a variety of shapes, and need not be generally hemispherical, but can be more "cup" shaped, as desired.

Preferably, tank liner 38 including cylindrical tube 20, first and second endcaps 22 and 24, and valve boss 34 are constructed of an inert, permeable and non-corrosive material with the inclusion of a barrier film 39 to reduce permeation ratio. As such, the tank liner 38 may be made from Polyethylene, but may also be fabricated of polymers such as, but not limited to, Polyamide, Polyethylene terephthalate, or any other material which would provide suitable structural support in accordance with the subject innovation.

In further accordance with the subject innovation, the tank 14 is further provided including an outer reinforcing layer 40 (also referred to as an additional layer) that is fabricated from plastic and can be wound or wrapped materials having composition of one or more elements.

Figure 6:
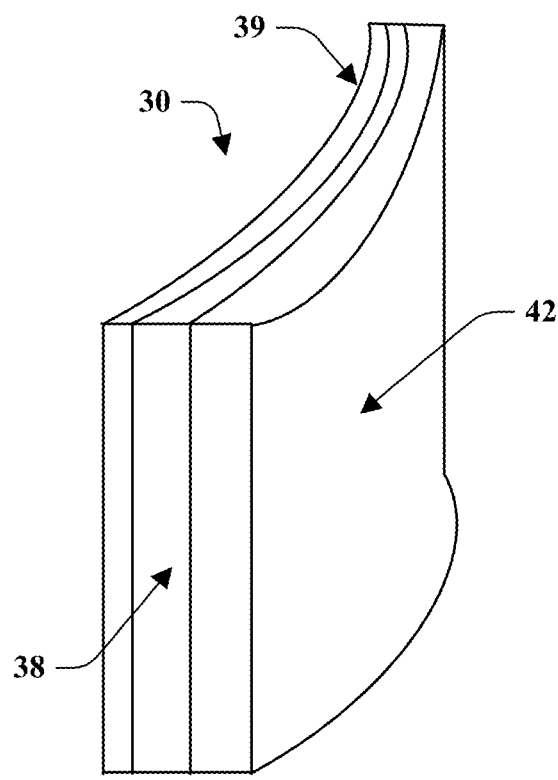
FIG. 6 is a partial cross-section view of the tank of the pressure vessel shown in FIG. 5, depicting layers of material of the tank.
Figure 7:
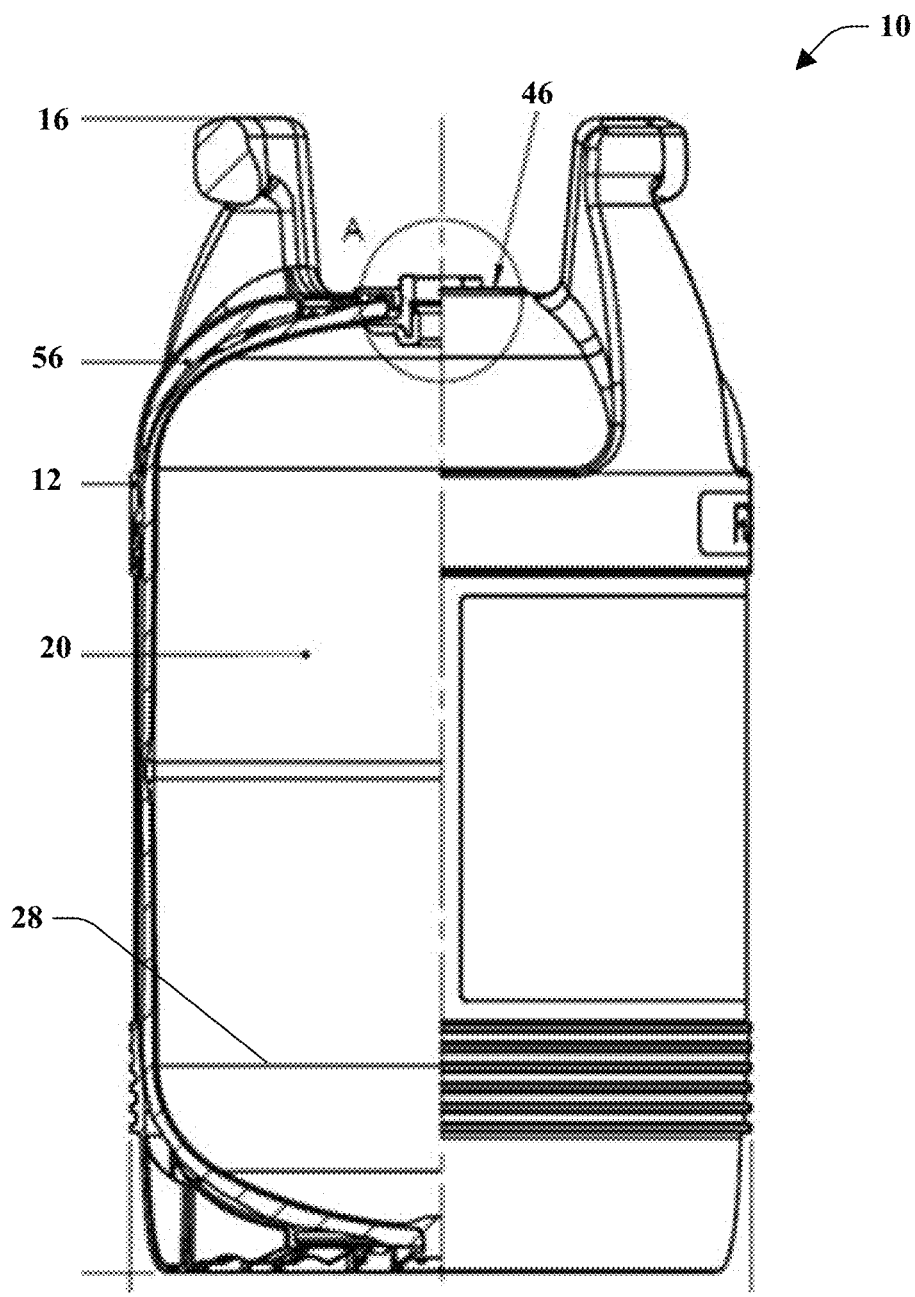
FIG. 7 is a partial cross-section view of the pressure vessel shown in FIG. 1.

For purposes of illustration and not limitation, as embodied herein and as depicted in FIG. 6, a cross section of a wall section of the tank 14 is depicted. As shown in FIG. 6, an outer reinforcing layer 42 is disposed about the tank liner 38. Reinforcing layer 42 is fabricated of one or more layers of a material having a higher elastic strain limit than that of the material used for the tank liner 38, as described in further detail below.

Reinforcing layer 42 may include a composite material having a skeleton that imparts desirable mechanical properties to the composite, such as a high tensile strength, and a matrix of material having high ductility that can bind the composite to render it stiff and rigid, among other things. Reinforcing layer 42 reinforces and provides impact resistance to the tank 14.

Preferably, the composite material for reinforcing layer 42 can include fibers or filaments that are commingled or impregnated onto or into the tank 14 as a tape with a thermoplastic resin. The commingled or impregnated fibers or filaments can be, but are not limited to being, combinations of glass (e.g., one or more glass types or materials having glass), metal, aramid, carbon, graphite, boron, synthetics, resins, epoxies, polyamides, polyoelfins, silicones, and polyurethanes, among other things. In a particular embodiment, the fibers or filaments are a composite of thermoplastic resin, such as at least one of a vinyl epoxy, a polypropylene, a glass fiber, or a combination thereof. The fibers or filaments can be formed from a commingled thermoplastic and glass fiber fabric or a impregnated thermoplastic/glass tape. In a particular embodiment, the composite material used in reinforcing layer 42 is a recyclable material such as a thermoplastic material.

Figure 2:
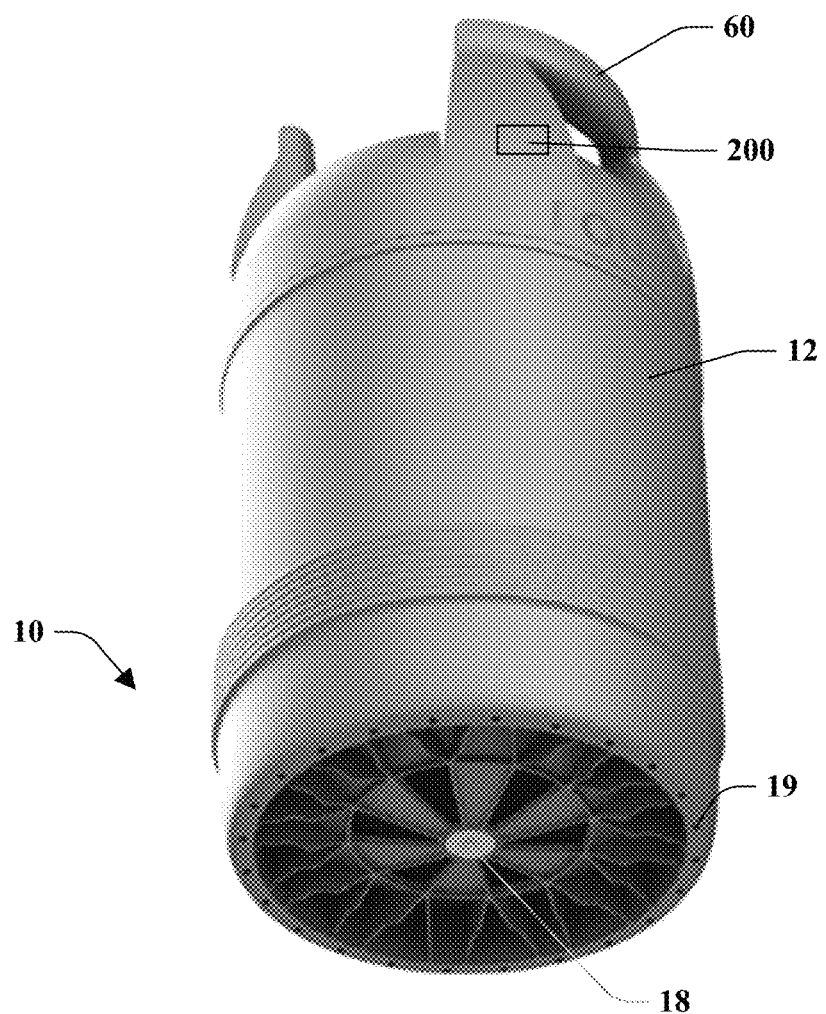
FIG. 2 is a perspective view of the pressure vessel shown in FIG. 1, as seen from below, showing the lower support rim of the protective jacket, as well as an opening therethrough.
Figure 3:
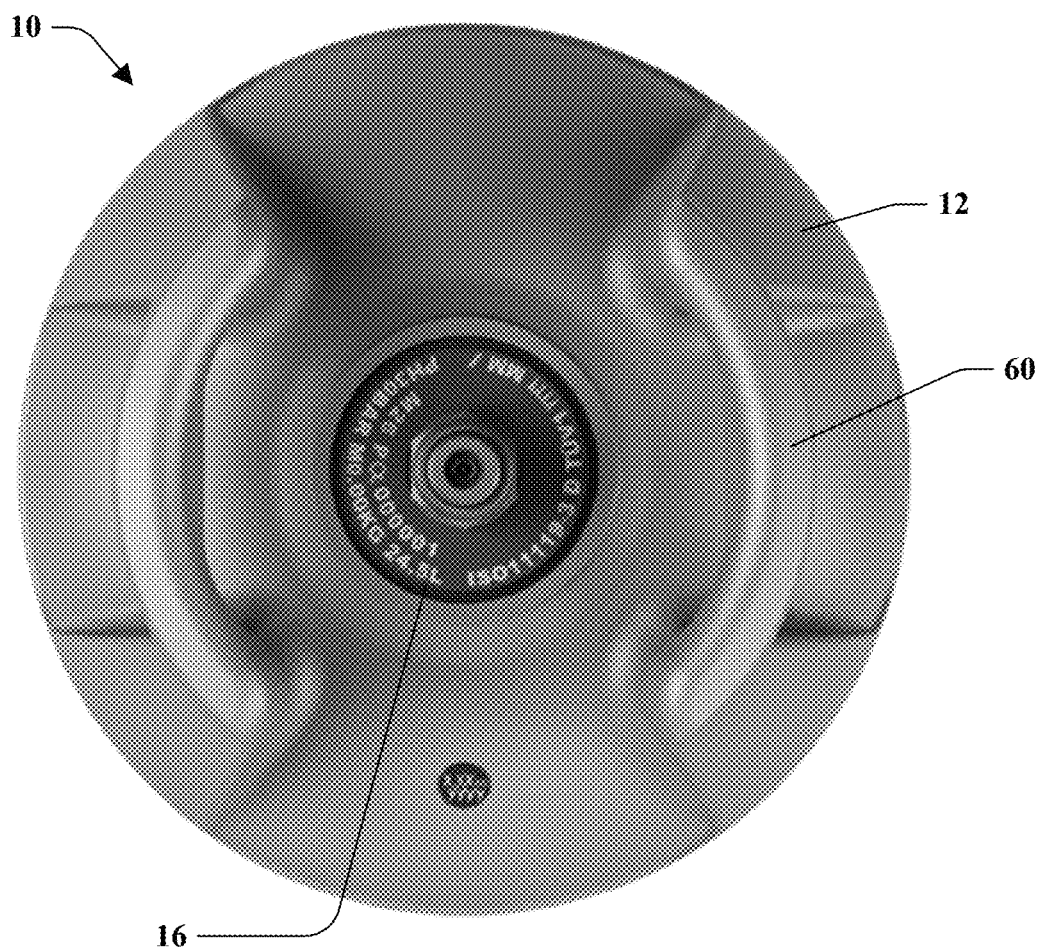
FIG. 3 is a top view of the pressure vessel shown in FIG. 1, depicting openings in the upper support rim to facilitate airflow through the protective jacket and further depicting handles on the upper support rim adapted and configured to allow access to the valve fitting assembly.
Figure 4:
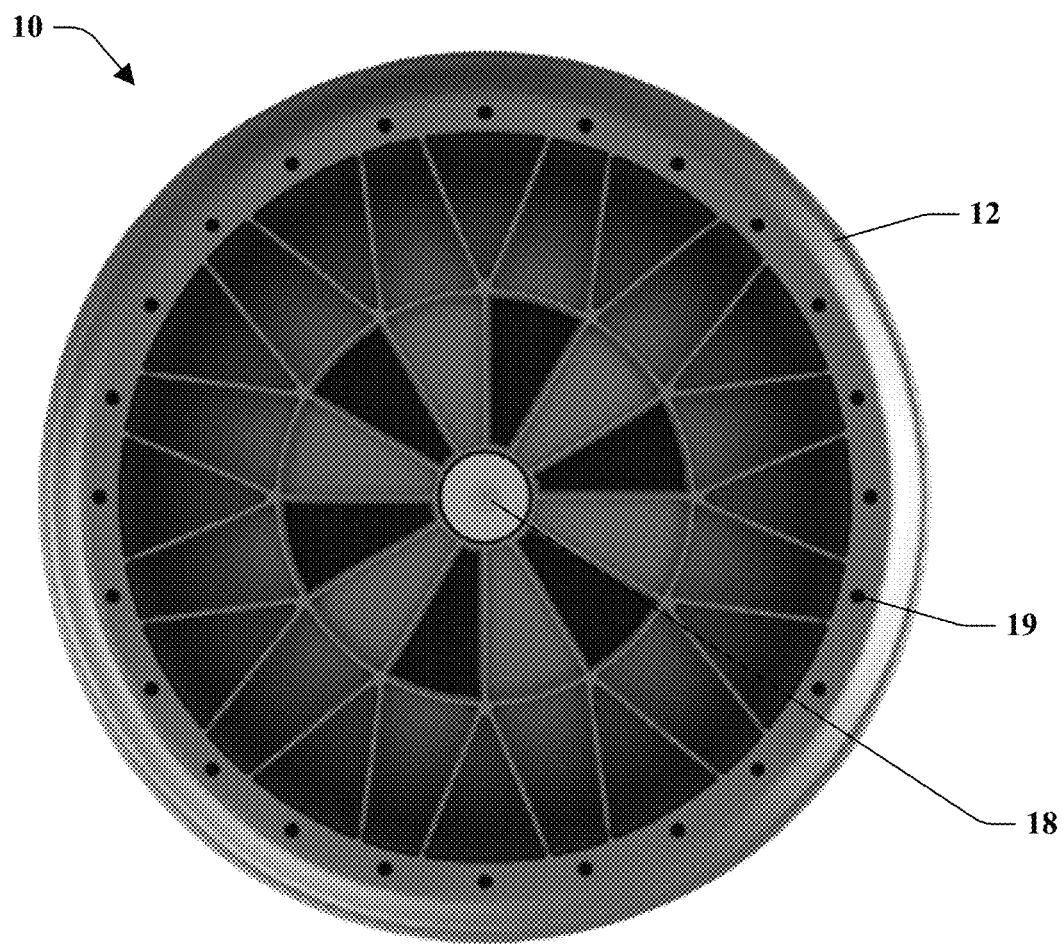
FIG. 4 is a bottom view of the pressure vessel shown in FIG. 1, showing an opening in the lower support rim for airflow into and out of the protective jacket.

In further accordance with the subject innovation, the pressure vessel includes a protective jacket. For purposes of illustration, and not limitation, as depicted in FIGS. 1-5, protective jacket 12 surrounds the tank 14. Protective jacket 12 has an upper support rim 46, and a lower support rim 50, and a substantially cylindrical wall 54 between the upper support rim 46 and lower support rim 50. Upper support rim 46 is disposed substantially about the periphery of an upper portion 48 of the tank 14 and a lower support rim 50 is disposed substantially about the periphery of a lower portion 52 of the tank 14. Upper support rim 46 defines a top aperture 47 in the protective jacket 12. The top aperture 47 serves as an opening for the valve fitting assembly 36 and also creates an upper airflow opening 16 between the upper support rim 46 and the valve fitting assembly 36. FIGS. 1 and 3 depict the upper airflow opening 16 in the upper support rim 46. FIGS. 2 and 4 depict the lower airflow opening 18 located in the center of the lower support rim 50. Upper airflow opening 16 and lower airflow opening 18 allow air to flow to and from outside to facilitate heat transfer between the environment and the pressurized contents of the tank 14, discussed in detail below. In certain embodiments, lower support rim 50 can further include a one or more water holes 19 around the perimeter of the lower support rim 50. Water holes 19 can be in fluid communication with the top aperture 47 so that any water that enters the upper airflow opening 16 can drain out through the water holes 19. Upper and lower support rims 46 and 50 are preferably configured to engage the tank 14 to restrict movement of the tank 14 within the confines of protective jacket 12. Movement is further restricted by the shock absorbing padding 56 in the upper support rim 46 disposed between protective jacket 12 and tank 14. Padding 56 can be made from a variety of materials, including expanded polypropylene (EPP), Polypropylene or Polyurethane, among others. In an embodiment, the padding 56 can be ARPRO® EPP for example. Padding 56 can also include air flow channels to allow air to flow through the padding 56 and into the air flow channel 58 shown in FIG. 9.

Protective jacket 12 is preferably constructed of a rigid, lightweight material, such as a hard plastic, but may alternatively be constructed from other materials. In this configuration, the protective jacket 12 can protect the tank 14 from impacts, abrasions, and exposure to corrosive materials, among other things.

The consumption of gas from a pressurized vessel can cause cooling of the pressurized vessel. This cooling can reach an extent to which the liquefied gas can no longer evaporate at an adequate rate. In this situation, there can be a pressure loss that hinders evacuation from the pressurized vessel. The transfer of heat from the ambient environment in which the pressure vessel is situated to the contents of the pressure vessel therefore should be facilitated to maintain the pressure of the contents of the pressure vessel during gas consumption. However, adding protective jackets to pressure vessels generally results in adding material between the pressurized contents and the environment. As such, protective jackets tend to insulate pressurized contents, hinder heat exchange, and ultimately promote the undesirable pressure loss during gas consumption. It is therefore desirable to minimize the insulative effects of protective jackets.

A jacket can be provided for pressure tanks in which wave-like undulations formed in the wall of a jacket provide channels for convective air flows, such as in U.S. Pat. No. 6,386,384, which is incorporated herein by reference in its entirety. These wave-like channels function well in providing for heat transfer in the case of tanks, but a fiber-composite or plastic composition embodiment of tank 14 creates a need for further advances to enhance the convective flow, since the reinforcing layer 42 provides more thermal insulation than prior tank compositions (e.g., all-metal, hybrid tanks, etc.).

The configuration of protective jacket 12 permits for enhanced flow that substantially surrounds the circumference of the tank 14. This allows heat exchange to take place along a greater surface area than allowed for in conventional techniques such as wave-like channels. This enhancement to the flow and surface area of the convective heat exchange helps compensate for the increased thermal insulation of the tank 14 as contrasted with conventional techniques.

Figure 9:
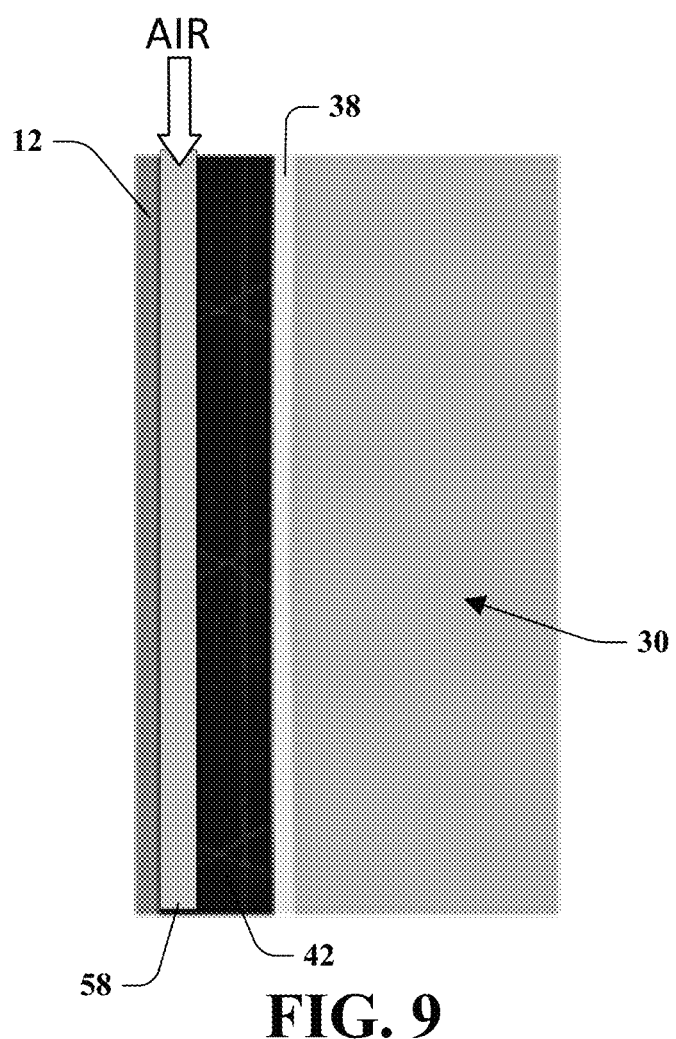
FIG. 9 is a partial cross-section view of the protective jacket and tank of the assembled pressure vessel shown in FIG. 1, showing the channel for flow of air between the tank and the protective jacket.

To this end, the subject innovation facilitates downward natural convective flows between the protective jacket 12 and the tank 14 to gain the advantages of the protective jacket while minimizing the loss of pressure due to inadequate heat exchange. The substantially cylindrical wall 54 of protective jacket 12 is disposed around a middle portion 51 of tank 14. As shown in FIG. 9, the inner surface of the substantially cylindrical wall 54 is spaced apart from the outer surface of the tank 14 to allow a generally downward vertical flow of air to develop between the tank 14 and the protective jacket 12. There is thus a generally annular flow channel 58 defined between the tank 14 and the protective jacket 12 in fluid communication with the environment in which the pressure vessel 10 is located.

Figure 8:
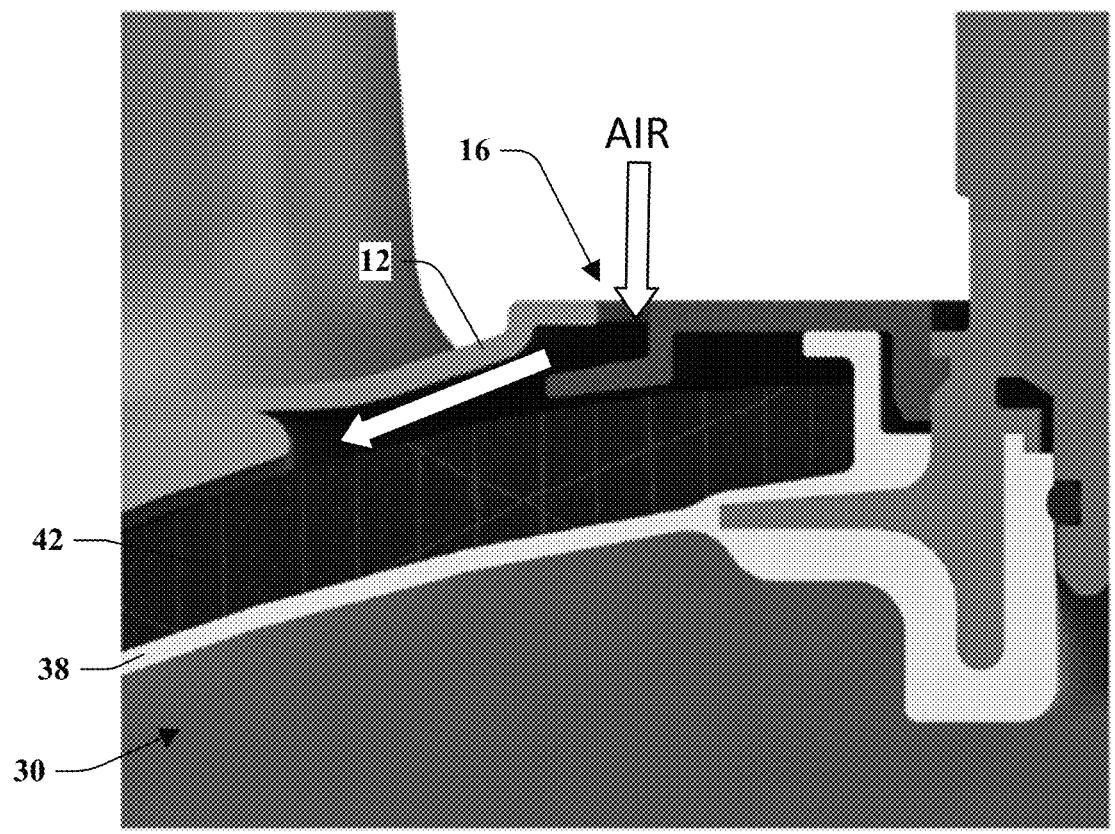
FIG. 8 is a partial cross-section view of the upper support rim of the protective jacket of the pressure vessel shown in area A of FIG. 7, where the plastic jacket is near the boss.
Figure 10:
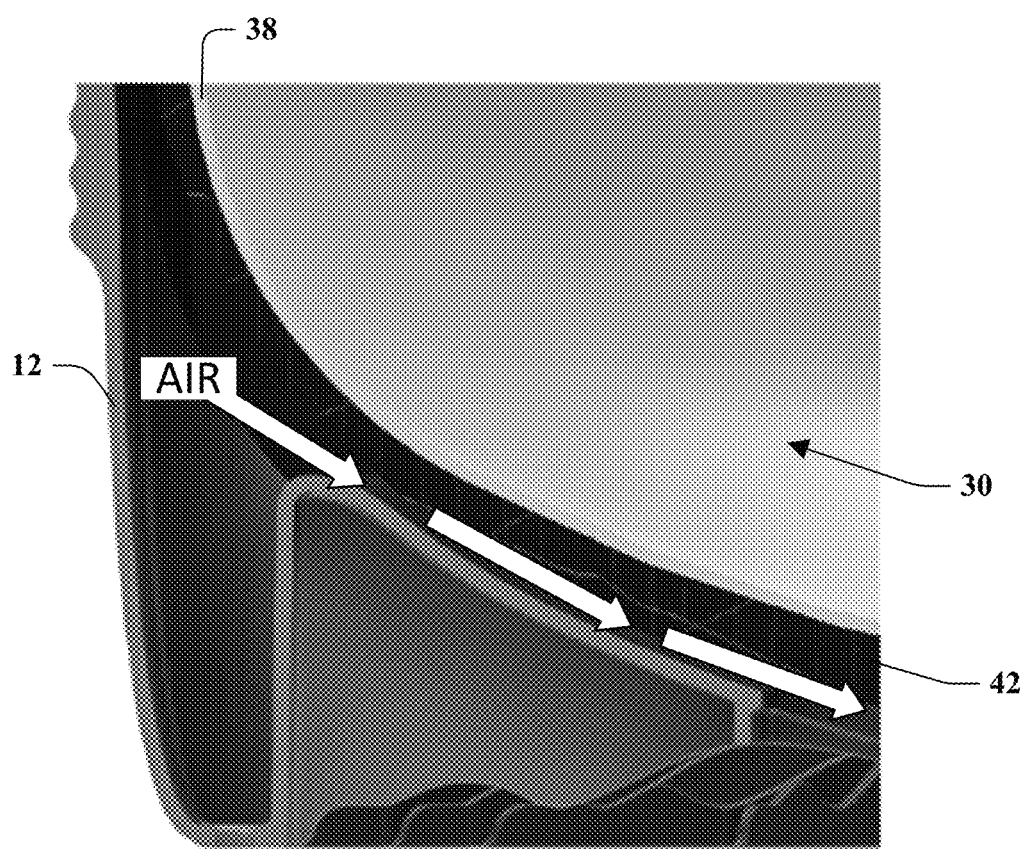
FIG. 10 is a partial cut away perspective view of the pressure vessel shown in FIG. 1, showing how the flow of air can pass through the gap in the lower support rim of protective jacket and the tank.

FIGS. 8-10 show how air can communicate from outside the pressure vessel 10, through the upper opening 16 around the valve fitting assembly 36, down into the annular flow channel 58 and out through the lower opening 18. In particular, FIGS. 8, 9, and 10 show how air can communicate from the substantially annular flow channel 58 inside the pressure vessel 10, through the lower opening 18, and into the environment. The ability of air to flow from the upper airflow opening 16 created by the top aperture 47 around the valve fitting assembly 36, through the annular flow channel 58, and out the lower opening 18 in the center of the lower support rim 50 permits natural convection flows to develop along the whole circumference of the annular flow channel 58, and thus gives the pressure vessel an enhanced ability to exchange heat between the tank 14 and the environment, while also having the added durability afforded by the protective jacket 12.

In another aspect of a preferred embodiment of the subject innovation, the protective jacket 12 includes at least one handle 60 configured to permit access to valve fitting assembly 36, as shown in FIGS. 1-3. Preferably, handle 60 is ergonomically designed to assist transport of pressure vessel 10.

Figure 11:
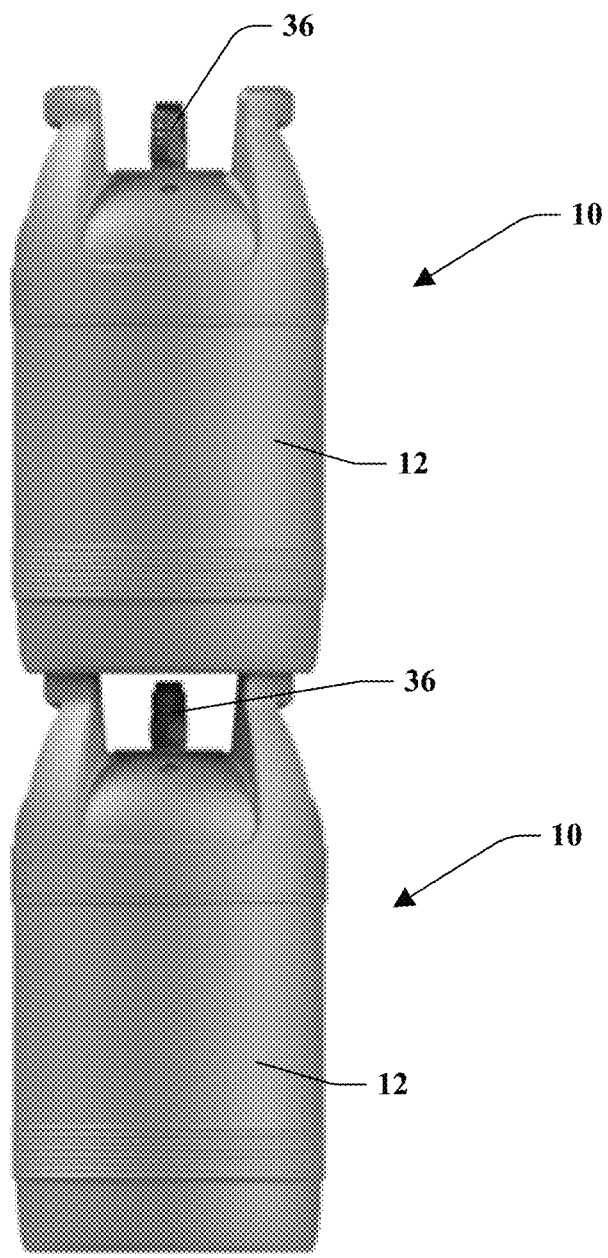
FIG. 11 is a side view showing two pressure vessels as depicted in FIG. 1 in a nested configuration.

By way of further example, for purposes of illustration only, as shown in FIG. 11, handle 60 and lower support rim 50 are preferably configured to engage one another to facilitate transporting and stacking a plurality of pressure vessels 10. In this embodiment, handles 60 are curved and configured to form a non-permanent mating engagement with lower support rim 50, which is configured to receive the handles 60, when stacking multiple pressure vessels 10.

In accordance with another embodiment of the subject innovation, a pressure vessel can be provided further including a means for uniquely identifying each tank. For purposes of illustration only, and not limitation, an identification means, such as a radio frequency identification tag, microchip or a Near Field Communication (NFC), Radio Frequency Identification (RFID) tag, and/or barcode 200 (FIG. 1) can be provided to uniquely identify each pressure vessel. During manufacture, a database can be maintained for uniquely identifying and tracking each cylinder after the cylinder leaves the manufacturing facility. A variety of variables can be tracked for each cylinder by the manufacturer, such as the tare weight, retest date, manufacturing date, batch or lot numbers, and the like.

In accordance with another aspect of the subject innovation, a method for manufacturing a pressure vessel is provided. For purposes of illustration only, and not limitation, the method preferably includes injecting a tank liner (such as tank liner 38), winding the thermoplastic composite onto the tank liner 38 under application of heat to form a tank 14, and attaching a protective jacket 12 to the tank 14 to create the substantially annular flow channel 58 as described herein.

In particular, the method of manufacturing the tank liner 38 can include using mold injection techniques to inject thermoplastic material into a mold. Moreover, one or more valve bosses 34 (also known as bungs) are further included on the tank liner 38 using co-injection molding techniques, where the one or more valve bosses 34 are injection molded at the same time the tank liner 38 is injection molded. For instance, a valve boss 34 can be placed inside the mold for the tank liner 38 and co-inject directly with the tank liner 38 where the valves are assembled at specified locations. In another embodiment, the one or more valve boss 34 can be glued, coupled, or welded to the tank liner 38. Further, the fabrication method can utilize barrier film 39 into the polymer that produces impermeability into the mold, and inject polymer above—which allows a low permeation ratio for LPG type IV tanks. For instance, the barrier film 39 can be, but is not limited to being, ethylene vinyl alcohol (EVOH). In one embodiment, the barrier film 39 comprises multiple layers, including a combination of one or more layers of polyethylene (PE), Polyamide (PA), and ethylene vinyl alcohol (EVOH). For example, the barrier film 39 can include a first layer of polyethylene, a second layer of polyamide, a third layer of EVOH, a fourth layer of polyamide, and a fifth layer of polyethylene. In one embodiment, the EVOH layer can have a thickness greater than or equal to 8 micrometers. In another embodiment, the EVOH can have a thickness of 10 micrometers. In still another embodiment, the EVOH thickness falls in the range between 2 micrometers and 16 micrometers.

The winding step can include rotating the tank liner on a mandrel while the filaments or tapes are wound onto the tank liner, as is known in the art. The winding may be done continuously with a single filament comprising the outer reinforcing layer 42 of tank 14.

Figure 5:
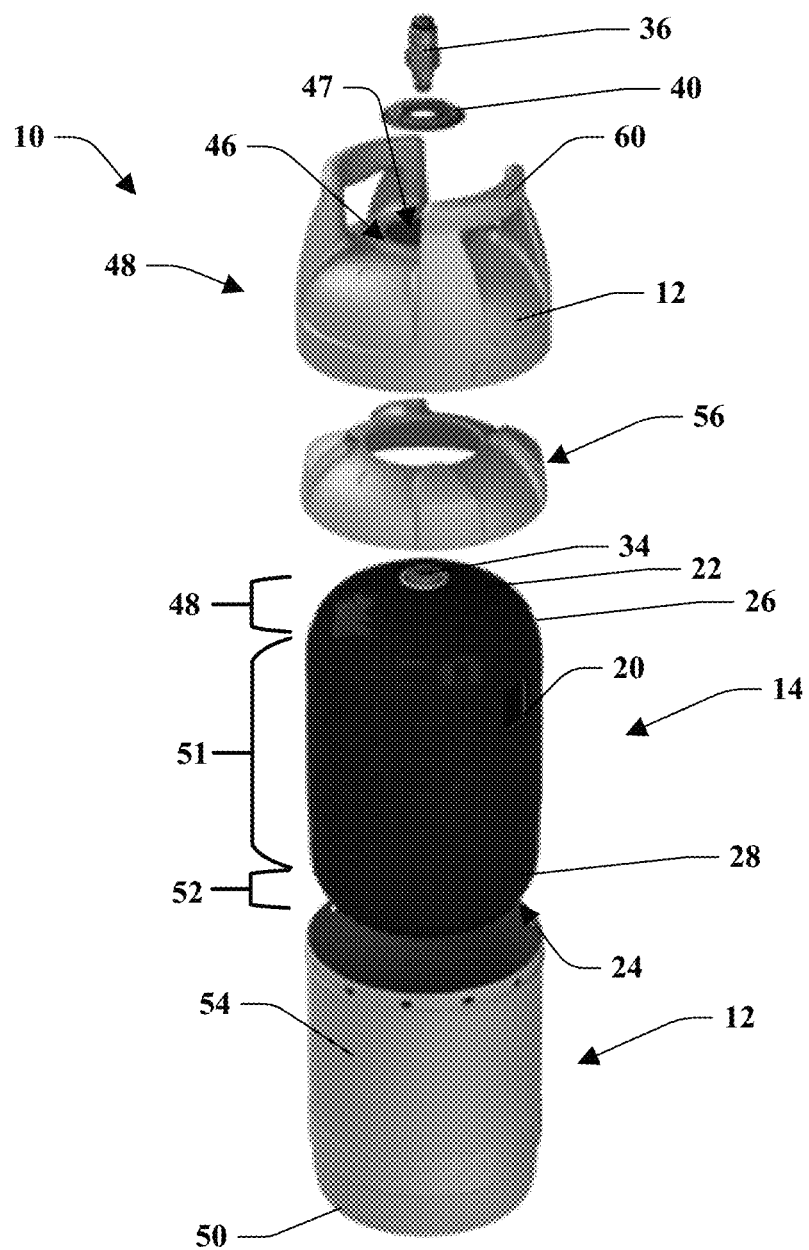
FIG. 5 is an exploded perspective view of the pressure vessel shown in FIG. 1.

In further accordance with the method of the subject innovation, it is possible for the protective jacket 12 to be attached to the tank 14 by having the protective jacket be separable into at least two sections that attach together with clipping systems as is known in the art. The sections can be separable along a circumference of the generally cylindrical wall 54 of protective jacket 12, as shown in FIG. 5. Or the sections could be separable longitudinally or obliquely without departing from the spirit and scope of the subject innovation. The sections of the jacket may be attached to one another by permanent or non-permanent engagement, as desired. For example, the sections of jacket 12 may be permanently attached to each other by welding, adhesive or fasteners. If desired, the connection between sections of jacket 12 may be non-permanent, such as by a snap fit or clipping connection.

The methods and systems of the subject innovation, as described above and shown in the drawings, provide for a pressure vessel with superior properties including ease of manufacture, light weight, ergonomics, stackability, resistance to corrosion and impact, and enhanced heat transfer. It will be apparent to those skilled in the art that various modifications and variations can be made in the device and method of the subject innovation without departing from the spirit or scope of the subject innovation. Thus, it is intended that the subject innovation include modifications and variations that are within the scope of the appended claims and their equivalents The aforementioned systems, components, (e.g., tank liner 14, protective jacket, pressure vessel, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

Figure 12:
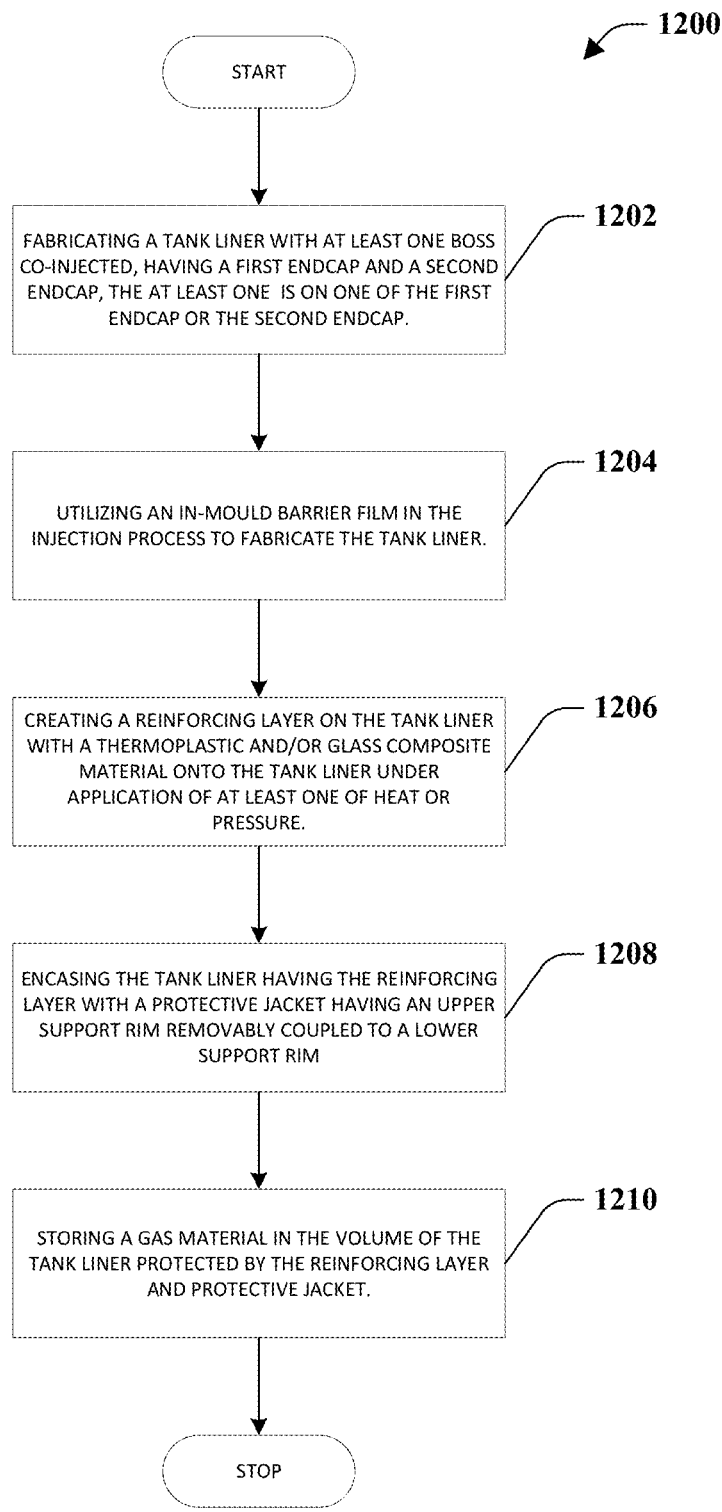
FIG. 12 illustrates a methodology of fabricating a pressure vessel in accordance with the subject innovation.

In view of the exemplary devices and elements described supra, methodologies that may be implemented in accordance with the disclosed subject matter will be better appreciated with reference to the flow chart(s) of FIG. 12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 12 illustrates a methodology of fabricating a pressure vessel having the features as described above.

Sequentially, the following occurs as illustrated in the decision tree flow diagram 1200 of FIG. 12 which is a flow diagram 1200 for fabricating a pressure vessel with a thermoplastic liner. At reference block 1202, a tank liner is fabricated by injection molding a first endcap and a second endcap that hold a volume. At least one valve boss 34 is co-injection molded on at least one of the first endcap, or the second endcap. The tank liner is configured to hold a volume. At reference block, 1204, an in-mould barrier film is utilized in the injection process to fabricate the tank liner. At reference block 1206, a reinforcing layer on the tank liner is created with a thermoplastic and/or glass composite material onto the tank liner under application of at least one of heat or pressure. At reference block 1208, the tank liner having the reinforcing layer is encased with a protective jacket having an upper support rim removeably coupled to a lower support rim. At reference numeral 1210, a gas material is stored in the volume of the tank liner protected by the reinforcing layer and protective jacket.

While the embodiments discussed herein have been related to the systems and methods discussed above, these embodiments are intended to be exemplary and are not intended to limit the applicability of these embodiments to only those discussions set forth herein. The embodiments and discussions herein can be readily incorporated into any of these systems and methodologies by those of skill in the art.

The above examples are merely illustrative of several possible embodiments of various aspects of the present innovation, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the innovation. In addition although a particular feature of the innovation may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the innovation, including the best mode, and also to enable one of ordinary skill in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the innovation has been described for purposes of illustrating the best mode known to the applicant at the time and enable one of ordinary skill in the art to practice the innovation, including making and using devices or systems and performing incorporated methods. The examples are illustrative only and not meant to limit the innovation, as measured by the scope and merit of the claims. The innovation has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the innovation is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A pressure vessel, comprising:
   a tank, including:
   i) a tank liner fabricated from thermoplastic material;
   ii) a valve fitting assembly; and
   ii) an outer reinforcing layer disposed on the tank liner, the outer reinforcing layer defining at least a portion of an outer surface of the tank; and
   a protective jacket adapted to surround and engage the tank, the protective jacket including:
   i) an upper support rim defining a top aperture, wherein the valve fitting assembly extends through the top aperture, and the top aperture at least partially defines a first airflow opening that completely encircles the valve fitting assembly;
   ii) a lower support rim having a second airflow opening therethrough; and
   iii) a substantially cylindrical wall connecting the upper support rim to the lower support rim, the wall defining an inner surface disposed radially outwardly from the outer surface of the tank, the inner surface of the wall and the outer surface of the tank cooperating to define a flow channel in fluid communication with the first airflow opening and the second airflow opening, wherein the first and second airflow openings and flow channel are adapted to permit a convective flow to pass therethrough to facilitate heat transfer between the tank and an environment in which the pressure vessel is situated.

2. The pressure vessel of claim 1, wherein the tank liner includes a first endcap and a second endcap, wherein the first and second endcaps are injected Polymeric domes circumferentially welded, and having a barrier film to increase impermeability.

3. The pressure vessel of claim 2, wherein the tank liner further comprises a boss co-injected on one of the first endcap or the second endcap.

4. The pressure vessel of claim 2, wherein the barrier film includes multiple layers.

5. The pressure vessel of claim 4, wherein the barrier film includes at least one layer comprising polyethylene, at least one layer comprising polyamide, and a layer comprising ethylene vinyl alcohol (EVOH).

6. The pressure vessel of claim 5, wherein the layer comprising EVOH has a thickness greater than or equal to 8 micrometers.

7. The pressure vessel of claim 1, wherein the protective jacket is separable into at least two sections.

8. The pressure vessel of claim 1, wherein the protective jacket includes at least one handle and wherein the lower support rim includes a base configured and is adapted to form a non-permanent mating engagement with the at least one handle of another pressure vessel when stacking multiple pressure vessels.

9. The pressure vessel of claim 1, wherein the outer reinforcing layer includes a thermoplastic matrix with glass fiber reinforcement.

10. The pressure vessel of claim 9, wherein the thermoplastic material includes polypropylene.

11. The pressure vessel of claim 1, wherein the tank liner includes a substantially cylindrical tube defining first and second rims and opposing dome shaped first and second endcaps secured to the first and second rims of the tube.

12. The pressure vessel of claim 1, wherein the tank liner includes opposing dome shaped first and second endcaps secured directly to each other.

13. The pressure vessel of claim 1, wherein the tank liner includes a co-injected boss for receiving the valve fitting assembly therein.

14. The pressure vessel of claim 1, wherein the flow channel is substantially annular.

15. A pressure vessel comprising:
   a) a tank including a tank liner constructed from a thermoplastic material having a boss co-injected therewith, a valve fitting assembly coupled with the boss, a reinforcing layer disposed on the tank liner, a top region, a bottom region disposed opposite the top region, and a middle region disposed between the top region and the bottom region;
   b) a protective jacket surrounding the tank, the protective jacket including an upper support rim that defines a top aperture, wherein the valve fitting assembly extends through the top aperture such that the top aperture at least partially defines a first airflow opening that completely encircles the valve fitting assembly, and the protective jacket further including a second airflow opening in fluid communication with the first airflow opening, wherein the protective jacket is spaced apart radially from the middle region; and
   c) a flow channel for directing a downward convective airflow between the middle region of the tank and the protective jacket, wherein the flow channel is in fluid communication with an ambient environment external to the pressure vessel via the first airflow opening and the second airflow opening.

* * * * *